United States Patent
Gurevich et al.

(10) Patent No.: US 9,756,215 B2
(45) Date of Patent: Sep. 5, 2017

(54) SYSTEM FOR, AND METHOD OF, CONTROLLING TARGET ILLUMINATION FOR AN IMAGING READER

(71) Applicant: SYMBOL TECHNOLOGIES, LLC, Lincolnshire, IL (US)

(72) Inventors: Vladimir Gurevich, Great Neck, NY (US); David P. Goren, Smithtown, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/938,355

(22) Filed: Nov. 11, 2015

(65) Prior Publication Data
US 2017/0134614 A1    May 11, 2017

(51) Int. Cl.
| | |
|---|---|
| G06K 7/14 | (2006.01) |
| H04N 1/024 | (2006.01) |
| H04N 1/40 | (2006.01) |
| H04N 1/028 | (2006.01) |
| G06K 7/10 | (2006.01) |
| H04N 5/353 | (2011.01) |
| H04N 1/00 | (2006.01) |

(52) U.S. Cl.
CPC ..... *H04N 1/40056* (2013.01); *G06K 7/10732* (2013.01); *G06K 7/10752* (2013.01); *H04N 1/0288* (2013.01); *H04N 1/02805* (2013.01); *H04N 5/3532* (2013.01); *G06K 7/109* (2013.01); *H04N 1/00519* (2013.01); *H04N 2201/0081* (2013.01)

(58) Field of Classification Search
CPC .......... H04N 1/00997; H04N 1/00334; H04N 1/00488; H04N 1/00564; H04N 1/02815; H04N 2201/0081
USPC .......................... 358/473, 475, 509; 382/313
See application file for complete search history.

(56) References Cited

U.S. PATENT DOCUMENTS

| | | | |
|---|---|---|---|
| 8,733,660 B2 | 5/2014 | Wang et al. | |
| 2006/0202036 A1* | 9/2006 | Wang ................. | G06K 7/10722 235/462.07 |
| 2009/0084847 A1* | 4/2009 | He ..................... | G06K 7/10722 235/455 |
| 2010/0147952 A1* | 6/2010 | Carlson ............. | G06K 7/10752 235/462.41 |
| 2013/0161392 A1* | 6/2013 | Goren ................ | G06K 7/10722 235/455 |
| 2015/0021400 A1 | 1/2015 | Lei et al. | |
| 2015/0144699 A1* | 5/2015 | Sackett ............. | G06K 7/10831 235/462.24 |

(Continued)

OTHER PUBLICATIONS

He et al., U.S. Appl. No. 15/155,211, filed May 16, 2016.

*Primary Examiner* — Cheukfan Lee

(57) ABSTRACT

An array of pixels of a solid-state imaging sensor having a rolling shutter is sequentially exposed to capture images from an illuminated target over successive frames for image capture by an imaging reader. The target is illuminated at a peak output power level for a fractional time period of a frame, and is not illuminated for at least a portion of a remaining time period of the frame for increased energy efficiency. Only a sub-array of the pixels is exposed during the fractional time period in which the target is being illuminated at the first output power level.

18 Claims, 5 Drawing Sheets

(56) References Cited

U.S. PATENT DOCUMENTS

2016/0034737 A1* 2/2016 Goren ................... G06K 7/146
235/455

* cited by examiner

SYSTEM FOR, AND METHOD OF, CONTROLLING TARGET ILLUMINATION FOR AN IMAGING READER

BACKGROUND OF THE INVENTION

The present disclosure relates generally to a system for, and a method of, controlling target illumination for an imaging reader that reads targets by image capture, and, more particularly, to controlling the illumination of a target during operation of a solid-state imaging sensor having a rolling shutter that sequentially exposes an array of pixels to capture an image from the illuminated target.

Solid-state imaging systems or imaging readers have been used, in both handheld and/or hands-free modes of operation, to electro-optically read targets, such as one- and two-dimensional bar code symbols, and/or non-symbols, such as documents, over a range of working distances relative to a light-transmissive window provided on each reader. The reader includes an imaging assembly having a solid-state imager or imaging sensor with an array of photocells or pixels, which correspond to image elements or pixels in an imaging field of view of the sensor, and an imaging lens assembly for capturing return light scattered and/or reflected from the target being imaged, and for projecting the return light onto the sensor to initiate capture of an image of each target. Such a sensor may include a one- or two-dimensional charge coupled device (CCD) or a complementary metal oxide semiconductor (CMOS) device, with global or rolling exposure shutters, and associated circuits for producing and processing electrical signals corresponding to a one- or two-dimensional array of pixel data over the imaging field of view. In order to increase the amount of the return light captured by the sensor, for example, in dimly lit environments or for far-out targets located relatively far from the window, the reader includes an illuminating light assembly for illuminating the target with illumination light over an illumination field for reflection and scattering from the target. The return light captured by the sensor includes the returning illumination light and any ambient light in the vicinity of the reader.

To achieve a desired image brightness, also known as a white level, for the captured image, it is known to use an automatic exposure controller (AEC) to control the sensor's exposure time, and to use an automatic gain controller (AGC) to control the sensor's gain. The AEC and the AGC are, in turn, controlled by a main controller or programmed microprocessor. Increasing the exposure time and/or the gain will increase the captured image brightness. A typical known strategy is to use exposure priority, in which the exposure time is increased first until a maximum exposure time or threshold (typically around 4-8 ms in order to reduce hand jitter motion effects for a handheld reader) is reached. If the image brightness is still too low as determined by the main controller, then the gain is increased. This strategy maximizes the signal-to-noise ratio (SNR) of the sensor, because the gain is only increased when necessary.

The amount of the illumination light delivered to, and returned from, the target by the illuminating light assembly is another factor that contributes to the captured image brightness. The greater the intensity or output power of the illumination light, the brighter is the captured image. It is known to maintain the illumination power supplied by the illuminating light assembly at a maximum or peak constant output power level during the AEC/AGC process.

When using a global shutter sensor where all the pixels are exposed at the same time, it is known to turn the illuminating light assembly on to illuminate the target only during the exposure time. This results in a very efficient use of the illumination light since the illuminating light assembly is turned off when not needed during non-exposure times. As the exposure time decreases, the less illumination light power is used. However, when using a lower cost, rolling shutter sensor where the pixels are sequentially exposed at different times, it is known to turn the illuminating light assembly on throughout the time of an entire frame, regardless of the exposure time, in order to illuminate and capture the entire target image. A typical exposure time is much shorter than the frame time (e.g., for a sensor operating at 30 frames per second, the maximum exposure time could be about 4 ms, while the frame time is 1/30 sec=33.3 ms). This results in a very inefficient use of the illuminating light assembly, especially for sensors having short exposure times and long frames. The additional electrical energy consumed during generation of the illumination light is not only wasteful and energy-inefficient, but also generates undesirable heat, reduces hand motion tolerance, and undesirably drains an on-board battery typically provided in handheld, wireless imaging readers, thereby requiring more frequent recharging, more downtime, and shorter working lifetimes.

Accordingly, there is a need to more efficiently control target illumination in real-time to reduce average illumination power over a frame, conserve electrical energy, reduce generated excess waste heat, and increase hand motion tolerance, in the operation of imaging readers having rolling shutter sensors, which are preferred over global shutters, primarily for cost savings, with a minimal impact on reading performance.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
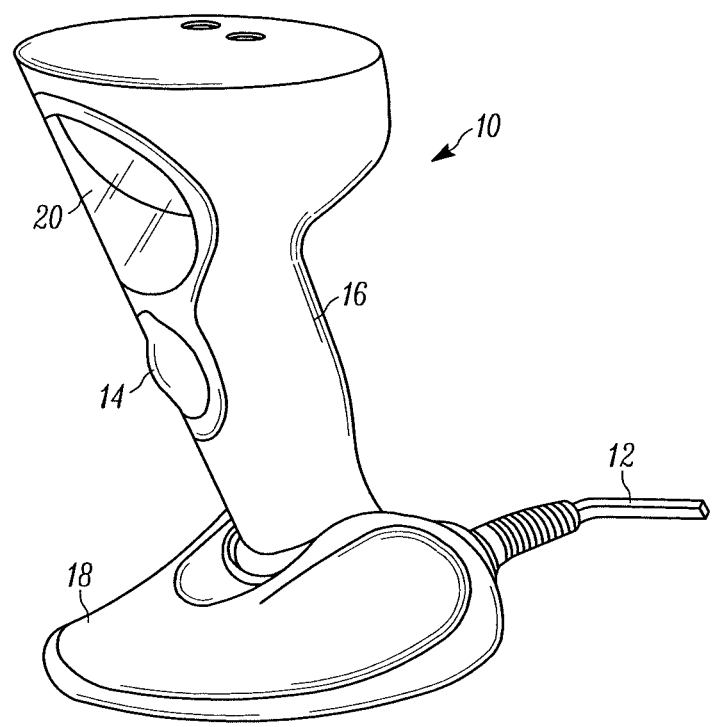
FIG. 1 is a view of an imaging reader operative in either a handheld or a hands-free mode, whose target illumination is to be controlled in accordance with the present disclosure.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure relates to a control system for an imaging reader having an illuminating light assembly for illuminating a target with illumination light, and a solid-state imaging sensor, e.g., a charge coupled device (CCD) or a complementary metal oxide semiconductor (CMOS) device, with a rolling shutter for sequentially exposing an array of pixels over an imaging field of view to capture images from the illuminated target over successive frames. The control system includes an illumination controller for controlling an output power level of the illumination light, and a main controller operatively connected to the imaging sensor and the illumination controller. The main controller controls the illumination controller to illuminate the target at a first output power level, e.g., a peak power level, for a fractional time period of a frame, and to illuminate the target at a second output power level, e.g., a zero power level, for at least a portion of a remaining time period of the frame. Only a sub-array of the pixels of the array is exposed during the fractional time period in which the target is being illuminated at the first output power level. The main controller controls the imaging sensor to capture a target image of the illuminated target.

The lowered output power during the remaining time period of the frame (while the illumination controller is deenergized at the zero power level) renders the operation of the illuminating light assembly to be more efficient, especially for rolling shutter sensors having short exposure times and long frames. Less electrical energy is consumed as compared to the prior art during generation of the illumination light. On-board battery drain is reduced, thereby requiring less frequent recharging, less downtime, and longer working lifetimes. Less waste heat is generated.

In one embodiment, particularly useful for a handheld reader, the imaging sensor captures a previous image of the target in a previous frame that precedes the frame and detects an image brightness level of the previous image. The image brightness level can be detected once for one previous frame in a reading session, or multiple times every plurality of previous frames in the reading session, or preferably, for each and every previous frame in the reading session. The target is illuminated at the peak output power level when, among other factors, the detected image brightness level is below a reference threshold level, which typically occurs when the target is located at a far end of a range of working distances from the handheld reader. In this case, the fractional time period advantageously occurs during a central time interval of the frame, and the sub-array of the pixels that are exposed during this central time interval are centrally situated in the array at opposite sides of an imaging centerline of the imaging field of view to capture the target image of the target at the far end of the range of working distances. The pixels are arranged in mutually orthogonal rows and columns, and the pixels of the sub-array that are exposed during this central time interval are a fractional number of the rows of the array and constitute a single group or middle band of the rows extending centrally row-wise horizontally across the array.

In another embodiment, particularly useful for a hands-free reader, the pixels are exposed in a swipe frame in which the target is swiped across the imaging field of view of the reader, and in a presentation frame in which the target is held momentarily steady in the imaging field of view of the reader. Preferably, the swipe frame alternates with the presentation frame. The fractional time period occurs during the swipe frame. More particularly, the pixels that are exposed during the fractional time period are a fractional number of the rows of the array and constitute a plurality of groups or upper, middle and lower bands of the rows extending in mutual parallelism row-wise horizontally across the array. One of the groups is exposed during one fractional time interval in an early part of the swipe frame, and another of the groups is exposed during another fractional time interval during a subsequent part of the swipe frame. The fractional time intervals constitute the fractional time period and occur during the swipe frame.

Another aspect of the present disclosure relates to a method of illuminating a target with illumination light, and of sequentially exposing an array of pixels of a solid-state imaging sensor having a rolling shutter over an imaging field of view to capture images from the illuminated target over successive frames for image capture by an imaging reader. The method is performed by controlling an output power level of the illumination light, by illuminating the target at a first or peak output power level for a fractional time period of a frame, by illuminating the target at a second or zero output power level that is less than the peak power level for at least a portion of a remaining time period of the frame, by exposing only a sub-array of the pixels of the array during the fractional time period in which the target is being illuminated at the first output power level, and by capturing a target image of the illuminated target.

Reference numeral 10 in FIG. 1 generally identifies an electro-optical reader for reading targets by image capture. The targets, such as one- and two-dimensional bar code symbols, are associated with, or are applied either directly on objects or on their packaging, and are jointly movable with the objects. The targets may also be non-symbol targets or the objects themselves, such as documents, drivers' licenses, checks, shipping labels, etc. As illustrated, the reader 10 has a window 20 and a gun-shaped housing 16 supported by a base 18 for supporting the reader 10 on a support surface, such as a countertop. The reader 10 can thus be used in a hands-free mode as a stationary workstation in which objects or products bearing targets are slid or swiped past the window 20 in a swipe mode, or momentarily held steady and presented to the window 20 in a presentation mode. The reader 10 can also be picked up off the countertop and held in an operator's hand and used in a handheld mode in which a trigger 14 is manually depressed to initiate reading of targets, especially one- or two-dimensional symbols, to be read. In another variation, the base 18 can be omitted, and housings of other shapes can be employed. The housing can also be permanently fixed to a stationary support. A power and data cable 12 that is connected to the base 18 can also be omitted, in which case, the reader 10 communicates with a remote host by a wireless transceiver, and the reader 10 is electrically powered by an on-board battery.

Although FIG. 1 depicts a gun-shaped housing 16, this is merely exemplary, because it will be understood that many other reader configurations may be employed in the practice of this invention disclosed herein. For example, the reader 10 may alternatively be configured as a vertical slot scanner having a generally upright window, or as a horizontal slot scanner or flat-bed scanner having a generally horizontal window, or as a bi-optical workstation having both a generally horizontal window and a generally upright window. The reader 10 may be used in many diverse environments.

Figure 2:
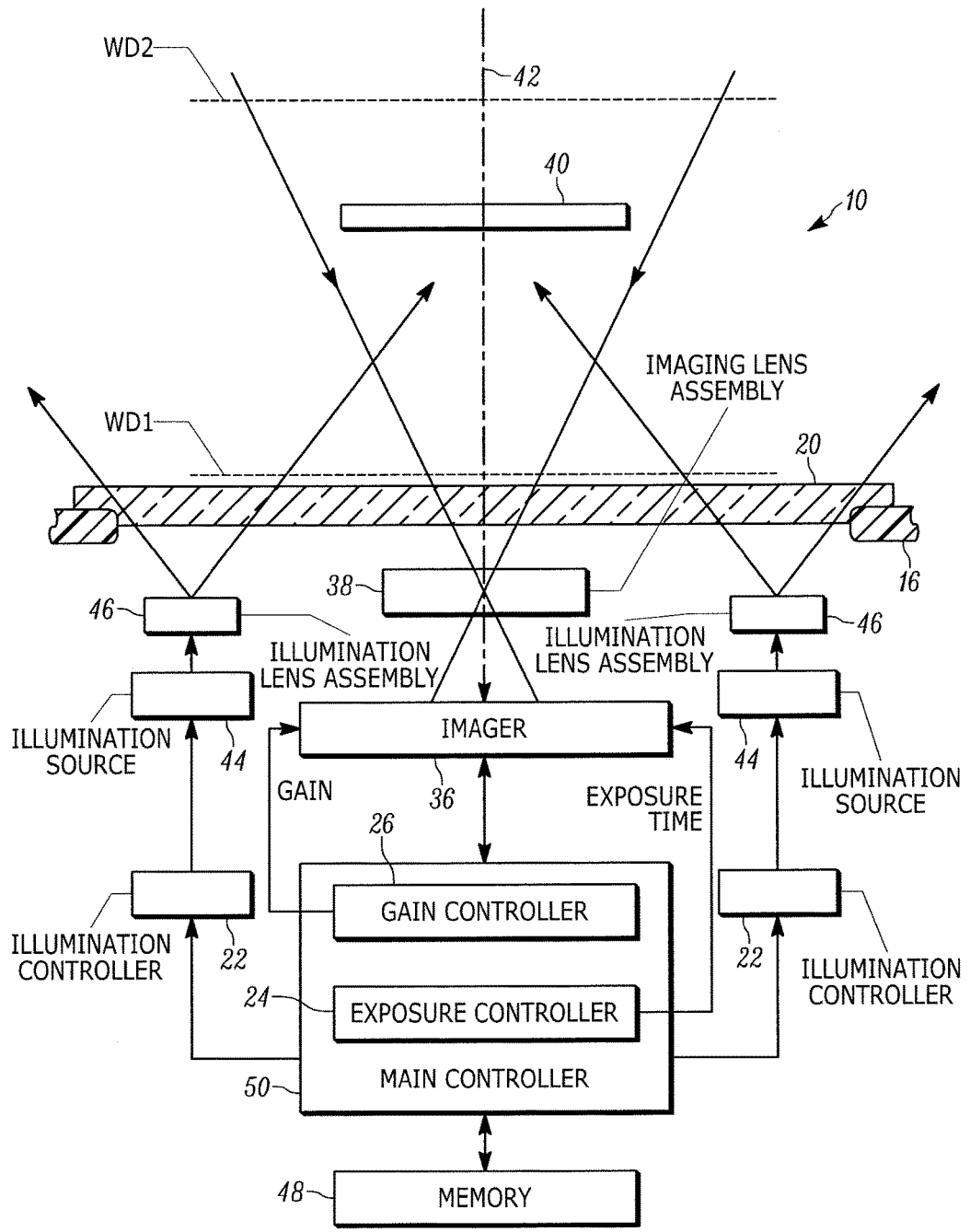
FIG. 2 is a diagrammatic view depicting system components of the reader of FIG. 1.

FIG. 2 schematically depicts an imaging module or scan engine mounted in the reader 10 behind the window 20. The imaging module includes a solid-state, imager or imaging sensor 36, and an imaging lens assembly 38, which may have one or more imaging lenses, such as a Cooke triplet. The sensor 36 has an array of pixels or photocells and may be a one- or two-dimensional charge coupled device (CCD) or a complementary metal oxide semiconductor (CMOS) device, preferably having a rolling exposure shutter, and is analogous to the sensors used in electronic digital cameras. The rolling shutter sequentially exposes the pixels that are typically arranged in mutually orthogonal rows and columns. The sensor 36 and the lens assembly 38 are together operative for capturing return light scattered and/or reflected from a target 40 to be read by image capture over an imaging field of view along an optical path or axis 42 through the window 20 and over a range of working distances between a close-in working distance (WD1) and a far-out working distance (WD2). In a preferred embodiment, WD1 is either at, or about a half inch away from, the window 20, and WD2 can be two feet and more from the window 20, although other numerical values are contemplated. The target 40 may be a printed code associated with a product, or an electronic code displayed on a mobile electronic device, such as a smartphone.

The reader 10 also has an energizable illuminating light assembly for illuminating the target 40 with illumination light from an illumination light source when energized. The illuminating light assembly includes, as illustrated, a pair of illumination light sources or light emitting diodes (LEDs) 44, and a corresponding pair of illumination lens assemblies 46 to uniformly illuminate the target 40 with illumination light when energized. The illumination LEDs 44 and the illumination lens assemblies 46 are preferably symmetrically located at opposite sides of the sensor 36.

A main controller or programmed microprocessor 50 controls operation of the electrical components of the assemblies, processes the captured return light from the target 40 as an image, and decodes the captured image. A memory 48 is connected, and accessible, to the main controller 50. The main controller 50 includes an electrical current driver or illumination controller 22 for each LED 44, an exposure controller 24 for controlling the exposure time of the sensor 36, and a gain controller 26 for controlling the gain of the sensor 36. The exposure and gain controllers 24, 26 are preferably software-based and integrated with the main controller 50, but they could also be hardware-based. Each illumination controller 22 is preferably hardware-based, but could also be software-based.

As previously mentioned, this disclosure is concerned with controlling the target illumination in an imaging reader having a rolling shutter with the goal of more efficiently utilizing the illuminating light assembly, conserving electrical power, reducing waste heat, reducing battery drain, and increasing hand motion tolerance.

Hence, in accordance with this disclosure, the main controller 50 controls the illumination controller 22 to illuminate the target 40 at a first or peak output power level for a fractional time period of a frame, and to illuminate the target 40 at a second or zero output power level that is less than the peak power level for at least a portion of a remaining time period of the frame. Advantageously, the illumination controller 22 is deenergized by the main controller 50 during the portion of the remaining time period of the frame. Only a sub-array of the pixels of the array is exposed during the fractional time period in which the target 40 is being illuminated at the first or peak output power level. The main controller 50 controls the imaging sensor 36 to capture a target image of the illuminated target 40.

As described above, it is known in the art to turn the illuminating light assembly on throughout the time of an entire frame in which the pixels are sequentially exposed by a rolling shutter, regardless of the exposure time, in order to illuminate and capture the entire target image. By lowering the output power, especially by deenergizing the illumination controller 22 during the remaining time period of the frame, the operation of the illuminating light assembly is more energy efficient, especially for rolling shutter sensors having short exposure times and long frames. Less electrical energy is consumed as compared to the prior art during generation of the illumination light. On-board battery drain is reduced, thereby requiring less frequent recharging, less downtime, and longer working lifetimes. Less waste heat is generated.

Figure 3:
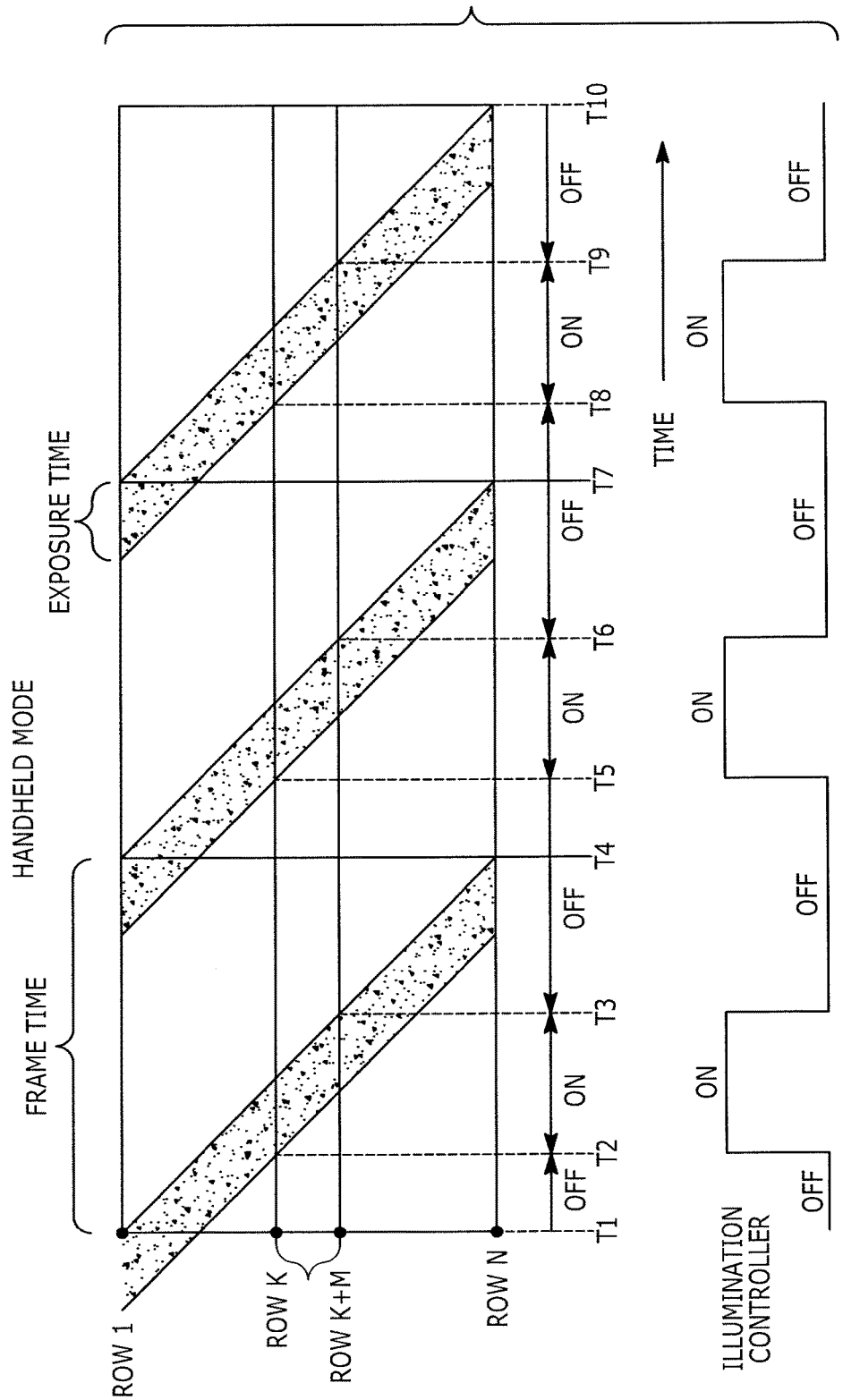
FIG. 3 is a set of graphs depicting how the illumination is controlled in the reader of FIG. 1 operated in the handheld mode.

FIG. 3 depicts the operation of the system of this disclosure, of particular benefit for a handheld embodiment of the reader 10. Three successive frame times and their exposure times (shown by speckled areas) are illustrated. The first, second, and third frames start at times T1, T4, and T7, respectively; and end at times T4, T7, and T10, respectively. For a rolling shutter, each exposure time starts slightly before its respective frame time. The pixels of the array are arranged in mutually orthogonal rows and columns; and the first row 1 is shown at the top, while the last row N is shown at the bottom, of FIG. 3. In a central portion of the array, a plurality or single group or middle band of the rows, which constitute a fraction of all the rows of the array, i.e., a sub-array, extends row-wise horizontally across the array, and starts from a higher middle row K and ends at a lower middle row K+M, where M is one or more. Exposure and read-out of the pixels begins at row 1, and continues along the illustrated downwards slope from left to right, over increasing time, across the middle rows K and K+M, and ends at row N.

As also shown in FIG. 3, the illumination controller 22 is turned ON by the main controller 50 to illuminate the target 40 at the peak output power level for a fractional time period of a frame, i.e., between times T2 and T3 of the first frame, between times T5 and T6 of the second frame, and between times T8 and T9 of the third frame, and so on for successive frames. The illumination controller 22 is preferably turned OFF by the main controller 50 during the remaining time period of each frame, i.e., between times T1 and T2 and times T3 and T4 of the first frame; between times T4 and T5 and times T6 and T7 of the second frame; and between times T7 and T8 and times T9 and T10 of the third frame, and so on for successive frames. All of the pixels of the imaging sensor 36 capture a target image of the target 40 during the entire frame, i.e., not only when the illumination controller 22 is turned ON, but also, when the illumination controller 22 is turned OFF. In the latter case, ambient light illuminates the target 40.

For the handheld reader, as the distance from the window 20 to the target 40 increases, the brightness of the captured image decreases. To compensate for this decreased or low brightness, the exposure controller 24 wants to increase the exposure time, which undesirably increases sensitivity to hand motion, and the gain controller 26 wants to increase the gain, thereby undesirably increasing electrical noise. In accordance with this disclosure, the illumination controller 22 is preferably turned ON when the brightness of the target image is below a reference threshold level, e.g., 25% of full brightness, and/or when the exposure time exceeds a reference threshold level, and/or when the gain exceeds a reference threshold level. A low image brightness, for example, indicates that the target 40 is far away from the window 20.

Thus, the illumination controller 22 is turned ON only at a central interval of each frame, e.g., between times T2 and T3 of the first frame, and only for a central group or middle band of the exposed pixels, e.g., the pixels between middle rows K and K+M, which are situated at opposite sides of an imaging centerline of the imaging field of view. The far-away target 40 is expected to be centrally located in the field of view, and to occupy a relatively small portion of the field of view in the vertical direction. Thus, it is the central, low vertical height, portion of the field of view that is being illuminated, and that is where the far-away target 40 is expected to be, as well as how the far-away target 40 is seen by the imaging sensor 36.

Advantageously, to determine image brightness, the imaging sensor 36 captures at least one previous image of the target 40 in a previous frame that precedes the frame in which the target image is captured. The image brightness level can be detected once for one previous frame in a reading session, or multiple times every plurality of previous frames in the reading session, or preferably, for each and every previous frame in the reading session. The main controller 50 and the imaging sensor 36 detect an image brightness level of each previous image, and the illumination controller 22 illuminates the target 40 at the peak output power level for the fractional time period of the frame when, as noted above, the detected image brightness level is below a reference threshold level. The gain controller 26 determines the gain, and the exposure controller 24 determines the exposure time. The number of rows of the sub-array between middle rows K and K+M is directly proportional to the detected image brightness level, and is inversely proportional to the exposure time, the gain, and the peak output power level. The fractional time period that the illumination controller 22 illuminates the target 40 at the peak output power level as compared to the remaining time period in each frame constitutes a duty cycle, and the peak output power level is inversely proportional to the duty cycle to keep the average illumination power level across each entire frame relatively constant.

Figure 4:
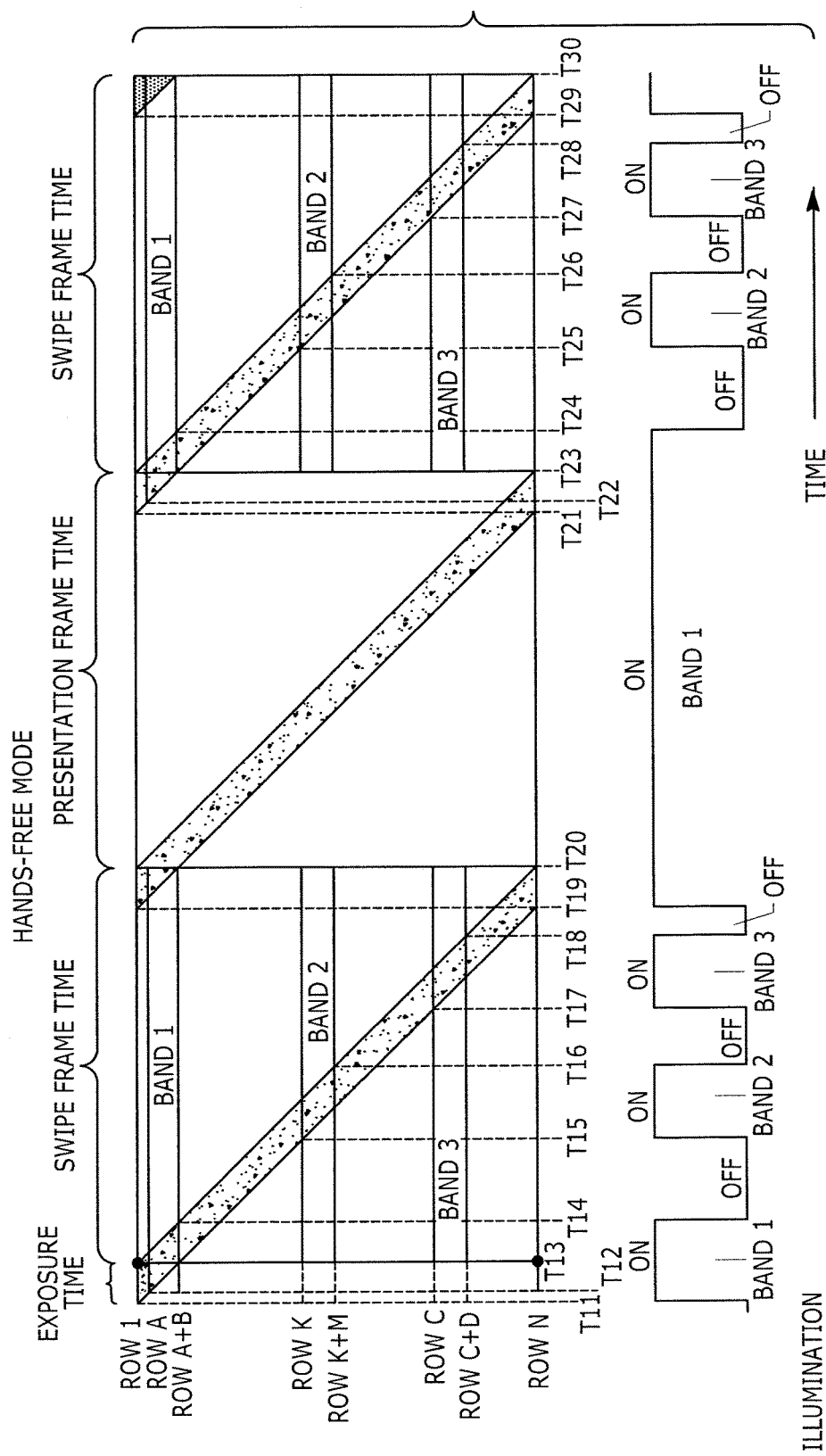
FIG. 4 is a set of graphs depicting how the illumination is controlled in the reader of FIG. 1 operated in the hands-free mode.

FIG. 4 depicts the operation of the system of this disclosure, of particular benefit for a hands-free embodiment of the reader 10. Three successive frame times and their exposure times (shown by speckled areas) are illustrated. The first, second, and third frames start at times T13, T20, and T23, respectively; and end at times T20, T23, and T30, respectively. For a rolling shutter, each exposure time starts slightly before its respective frame time, e.g., at times T11, T19, and T21. The first and third frames are swipe frames in which in which the target 40 is best read by being swiped or moved across the window 20 across the imaging field of view of the reader 10, and the second frame is a presentation frame in which the target 40 is best read by being held momentarily steady at the window 20 in the imaging field of view of the reader 10. It is not known in advance which way an operator will use the reader to read a particular target 40. As shown, the swipe frame alternates with the presentation frame. It is also contemplated that different occurrences of the swipe and presentation frames can occur. For example, the presentation frame can alternate with every two, or more, swipe frames, and vice versa.

The pixels of the array are arranged in mutually orthogonal rows and columns; and the first row 1 is shown at the top, while the last row N is shown at the bottom, of FIG. 4. In a central portion of the array, a plurality or central group (middle band 2) of the rows, which constitute a fraction of all the rows of the array, extends row-wise across the array, and starts from a higher middle row K and ends at a lower middle row K+M, where M is one or more. In an upper portion of the array, a plurality or upper group (upper band 1) of the rows, which constitute a fraction of all the rows of the array, extends row-wise across the array, and starts from a higher row A and ends at a lower row A+B, where B is one or more. In a lower portion of the array, a plurality or lower group (lower band 3) of the rows, which constitute a fraction of all the rows of the array, extends row-wise across the array, and starts from a higher row C and ends at a lower row C+D, where D is one or more. The three bands 1, 2 and 3 extend in mutual parallelism row-wise horizontally across the array. In each swipe frame, exposure and read-out of the pixels begins at row 1, and continues along the illustrated downwards slope from left to right, over increasing time, in succession across the upper rows A and A+B (band 1), the middle rows K and K+M (band 2), and the lower rows C and C+D (band 3), and ends at row N.

As also shown in FIG. 4, the illumination controller 22 is turned ON by the main controller 50 to illuminate the target 40 at the peak output power level for a fractional time period of each swipe frame, i.e., between initial times T12-T14 (band 1), between intermediate times T15-T16 (band 2), and between subsequent times T17-T18 (band 3) of the first swipe frame; and between initial times T22-24 (band 1), between intermediate times T25-26 (band 2), and between subsequent times T27 and T28 (band 3) of the second swipe frame; and so on for successive swipe frames. The illumination controller 22 is preferably turned OFF by the main controller 50 during the remaining time period of each frame, i.e., between times T14-T15, between times T16-17, and between times T18-19 of the first swipe frame; and between times T24-T25, between times T26-T27, and between times T28-29 of the second swipe frame; and so on for successive swipe frames. In each swipe frame, all of the pixels of the imaging sensor 36 capture a target image of the target 40 not only when the illumination controller 22 is turned ON, but also when the illumination controller 22 is turned OFF. When the illumination controller 22 is turned OFF, ambient light helps to illuminate the target 40. Although three illuminated bands of pixels have been illustrated in each swipe frame, it will be understood that this is merely exemplary, because a different number of illuminated bands could be employed. The number of illuminated bands is selected to make sure that the return light will not fall between the illuminated bands.

As further shown in FIG. 4, the illumination controller 22 is turned ON for the entire duration of each presentation frame, thereby illuminating the entire field of view. The output power level is preferably not at the peak power level, but at a lower level during the presentation frame, and a relatively long exposure time can be used. Thus, the illumination controller 22 is ON only at an initial (band 1), an intermediate (band 2), and a subsequent (band 3), fractional time interval of each swipe frame, and is also ON for the entire duration of each presentation frame. For the hands-free reader, brightness of the captured image is not an issue, because the distance from the window 20 to the target 40 is typically very short.

Figure 5:
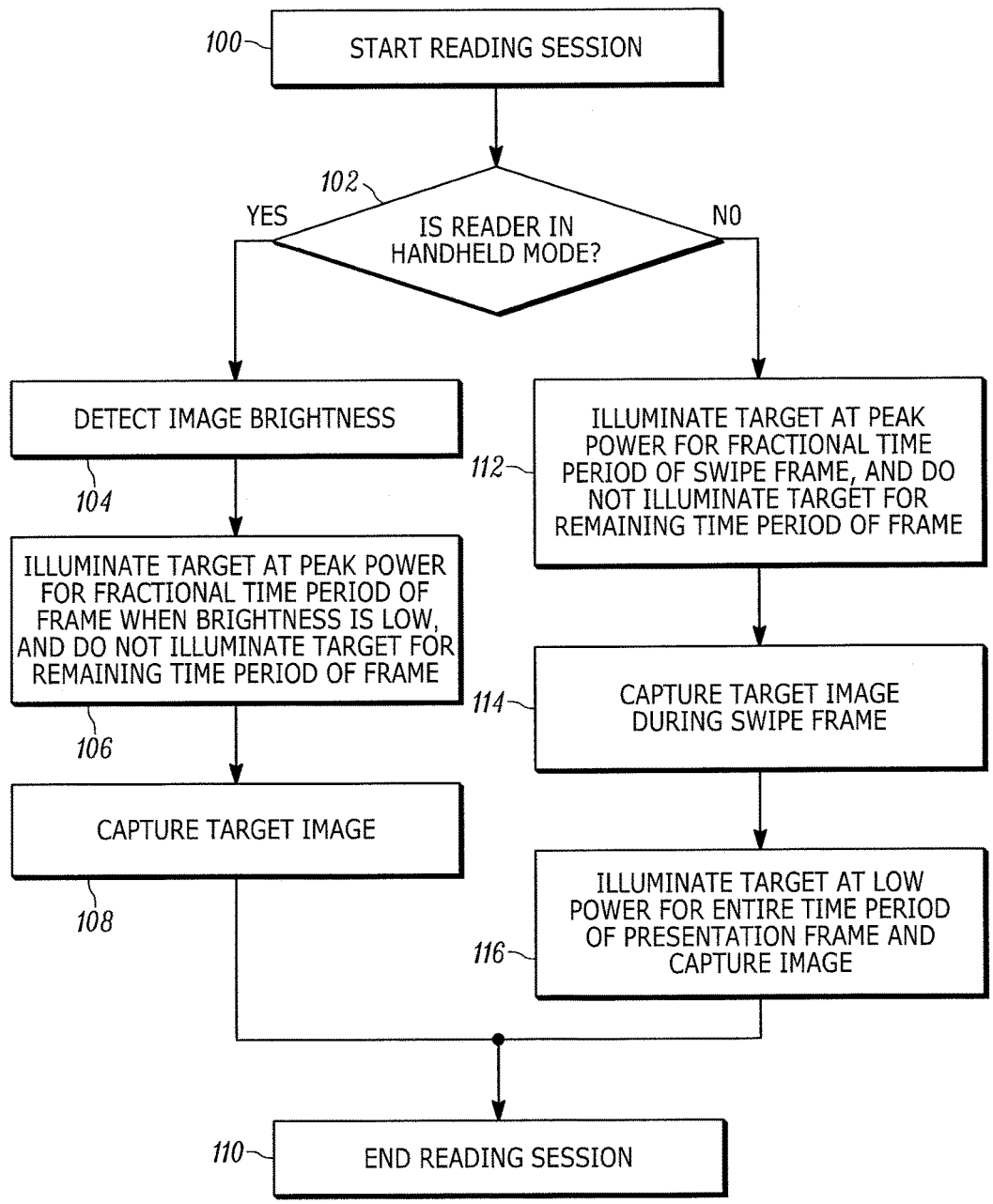
FIG. 5 is a flow chart depicting steps performed in accordance with the method of the present disclosure Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

Turning now to the flow chart of FIG. 5, the method of illuminating the target 40 with illumination light, and of capturing an image from the illuminated target 40, begins at step 100, and then the main controller 50 determines whether the reader 10 is in the handheld or the hands-free mode (step 102). This can be done in various ways, and typically a mechanically operated switch is actuated to one of two states to indicate the mode. If the reader 10 is in the handheld mode, then the image brightness of a previous frame is detected (step 104) and, if the image brightness is below a reference level (thereby indicating that the target 40 is far away from the reader 10), then the target 40 is illuminated at a peak power level for a fractional, e.g., central, time period of a frame, and is preferably not illuminated for the remainder of the frame (step 106). Only a sub-array of the pixels of the array is exposed during the fractional time period in which the target 40 is being illuminated at the first output power level. An image of the illuminated target 40 is captured by the array (step 108). The reading session ends at step 110.

If the reader 10 is in the hands-free mode, then the target 40 is illuminated at a first or peak power level for a fractional, e.g., an initial, an intermediate, and a subsequent, time period of a swipe frame, and is not illuminated for the remainder of the swipe frame (step 112). Again, only a sub-array of the pixels of the array is exposed during the fractional time period of the swipe frame in which the target 40 is being illuminated at the first or peak output power level. An image of the target 40 is captured by array during the swipe frame (step 114). The target 40 is illuminated at a low power level for the entire time period of the presentation frame, and the image is captured with the entire array of the sensor 36 during the presentation frame (step 116). The reading session again ends at step 110.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A control system for an imaging reader having an illuminating light assembly for illuminating a target with illumination light, and a solid-state imaging sensor with a rolling shutter for sequentially exposing an array of pixels over an imaging field of view to capture images from the illuminated target over successive frames, the control system comprising:

an illumination controller to control an output power level of the illumination light; and a main control in communication with the imaging sensor and the illumination controller, the main controller to:
cause the imaging sensor to capture at least one previous image of the target in a previous frame that precedes at least one of the frames;
detect an image brightness level of the previous image;
cause the illuminating light assembly to operate at a first output power level for at least one fractional time interval of the at least one frame when the detected image brightness level is below a reference threshold level, and
cause the illuminating light assembly to operate at a second output power level that is less than the first output power level for at least a portion of a remaining time period of the at least one frame, wherein:
only a sub-array of the pixels of the array are exposed during the at least one fractional time interval; and
the main controller is to cause the imaging sensor to capture a target image of the illuminated target.

2. The system of claim 1, wherein the first output power level is a peak power level, and wherein the second output power level is a zero power level.

3. The system of claim 1, wherein the main controller detects the image brightness level as being below the reference threshold level when the target is located at a far end of a range of working distances from the imaging reader, and wherein one of the at least one fractional time interval occurs during a central time interval of the at least one frame, and wherein the sub-array of the pixels that are exposed during the central time interval are centrally situated in the array at opposite sides of an imaging centerline of the imaging field of view and capture the target image of the target at the far end of the range of working distances.

4. The system of claim 1, wherein the array is a two-dimensional array in which the pixels are arranged in mutually orthogonal rows and columns, and wherein the sub-array is a fractional number of the rows constituting a single group of the rows extending centrally row-wise across the array.

5. The system of claim 4, further comprising:
an exposure controller to control an exposure time of the imaging sensor, and
a gain controller to control a gain of the imaging sensor, wherein the fractional number of rows of the sub-array is directly proportional to the detected image brightness level and inversely proportional to the exposure time, the gain, and the first output power level.

6. The system of claim 1, wherein the array is a two-dimensional array in which the pixels are arranged in mutually orthogonal rows and columns, and wherein the sub-arrays is fractional number of the rows constituting a plurality of groups of the rows extending in mutually parallelism row-wise across the array.

7. The system of claim 6, wherein the at least one fractional time interval includes one initial fractional time interval during which the pixels in one of the groups are exposed, and at least another subsequent fractional time interval during which the pixels in another of the groups are exposed.

8. The system of claim 1, wherein the main controller is to control the imaging sensor to expose the pixels in a swipe frame in which the target is swiped across the imaging field of view of the imaging reader, and in a presentation frame in which the target is held momentarily steady in the imaging field of view of the imaging reader, and wherein the at least one frame during which the at least one fractional time interval occurs is the swipe frame.

9. The system of claim 1, wherein the at least one fractional time interval constitutes a duty cycle, and wherein the first output power level is inversely proportional to the duty cycle.

10. A method of illuminating a target with an illumination light assembly, and of sequentially exposing an array of pixels of a solid-state imaging sensor having a rolling shutter over an imaging field of view to capture images from the illuminated target over successive frame for image capture by an imaging reader, the method comprising:
controlling an output power of the illumination light assembly;
operating the illumination light assembly at a first output power level for at least one fractional time interval of at least one of the frames;
capturing at least one previous image of the target in a previous frame that precedes the at least one frame;
detecting an image brightness level of the previous image, wherein the operating of the illumination light assembly at the first output power level for the at least one fractional time interval of the at least one frame is performed when the detected image brightness level is below a reference threshold level;
operating the illumination light assembly at a second output power level that is less than the first output power level for at least a portion of a remaining time period of the at least one frame;
exposing only a sub-array of the pixels of the array during the at least one fractional time interval; and
capturing a target image of the illuminated target.

11. The method of claim 10, wherein the first output power level is a peak power level, and wherein the second output power level is a zero power level.

12. The method of claim 11, wherein the at least one fractional time interval constitutes a duty cycle, the first output power level to be inversely proportional to the duty cycle.

13. The method of claim 10, wherein the detecting of the image brightness level below the reference threshold level occurs when the target is located at a far end of a range of working distances from the imaging reader, and wherein one of the at least one fractional time interval occurs during a central time interval of the at least one frame, and wherein the sub-array of the pixels are centrally located at opposite sides of an imaging centerline of the imaging field of view to capture the target image of the target at the far end of the range of working distances.

14. The method of claim 10, wherein the array is configured as a two-dimensional array in which the pixels are arranged in mutually orthogonal rows and columns, and the sub-array is configured as a fractional number of the rows constituting a single group of the rows extending centrally row-wise across the array.

15. The method of claim 14, further comprising controlling an exposure time of the imaging sensor, controlling a gain of the imaging sensor, and configuring the fractional number of rows of the sub-array to be directly proportional to the detected image brightness level and inversely proportional to the exposure time, the gain, and the first output power level.

16. The method of claim 10, wherein the array is configured as a two-dimensional array in which the pixels are arranged in mutually orthogonal rows and columns, and the sub-array is configured as a fractional number of the rows constituting a plurality of the rows extending in mutually parallelism row-wise across the array.

17. The method of claim 16, further comprising configuring the at least one fractional time interval with one initial fractional time interval during which the pixels in one of the groups are exposed, and with at least another subsequent fractional time interval during which the pixels in another of the groups are exposed.

18. The method of claim 10, further comprising exposing the pixels in a swipe frame in which the target is swiped across the imaging field of view of the imaging reader, and in a presentation frame in which the target is held momentarily steady in the imaging field of view of the imaging reader, and wherein the at least one frame during which the at least one fractional time interval occurs is the swipe frame.

* * * * *